United States Patent
Komori et al.

(10) Patent No.: US 8,840,313 B2
(45) Date of Patent: Sep. 23, 2014

(54) BEARING APPARATUS FOR A WHEEL OF VEHICLE

(75) Inventors: Kazuo Komori, Iwata (JP); Masahiro Kiuchi, Iwata (JP); Kazuhiro Baba, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 12/057,531

(22) Filed: Mar. 28, 2008

(65) Prior Publication Data
US 2008/0199121 A1    Aug. 21, 2008

Related U.S. Application Data

(63) Continuation of application No. PCT/JP2006/319693, filed on Oct. 2, 2006.

(30) Foreign Application Priority Data

| Sep. 30, 2005 | (JP) | 2005-287267 |
| Oct. 21, 2005 | (JP) | 2005-306888 |
| Oct. 21, 2005 | (JP) | 2005-306889 |
| Oct. 27, 2005 | (JP) | 2005-313155 |
| Oct. 31, 2005 | (JP) | 2005-316053 |
| Aug. 7, 2006 | (JP) | 2006-214124 |

(51) Int. Cl.
| *F16C 13/00* | (2006.01) |
| *F16C 33/58* | (2006.01) |
| *F16C 33/64* | (2006.01) |
| *B60B 27/00* | (2006.01) |
| *F16C 19/18* | (2006.01) |

(52) U.S. Cl.
CPC ........... *B60B 27/0005* (2013.01); *F16C 33/581* (2013.01); *F16C 33/64* (2013.01); *B60B 27/0084* (2013.01); *F16C 2240/80* (2013.01); *B60B 27/0094* (2013.01); *F16C 33/585* (2013.01); *Y02T 10/86* (2013.01); *F16C 2326/02* (2013.01); *F16C 19/186* (2013.01)
USPC .......................................... 384/544; 384/513

(58) Field of Classification Search
USPC ............... 384/544, 589, 513; 301/105.1, 125
See application file for complete search history.

(56) References Cited

U.S. PATENT DOCUMENTS

| 4,668,111 A | * | 5/1987 | Kapaan .................... 384/544 |
| 5,051,004 A | * | 9/1991 | Takeuchi et al. ............. 384/516 |

(Continued)

FOREIGN PATENT DOCUMENTS

| DE | 202004020400 U1 * | 7/2005 |
| EP | 1 548 307 | 6/2005 |

(Continued)

OTHER PUBLICATIONS

Translation of JP 2004-109449, Apr. 8, 2004.*

(Continued)

*Primary Examiner* — Alan B Waits
(74) *Attorney, Agent, or Firm* — Harness, Dickey & Pierce, P.L.C.

(57) ABSTRACT

A vehicle wheel bearing apparatus has an outer member (2, 30) formed with double row outer raceway surfaces (2a, 2b) on its inner circumferential surface. Inner members (1, 20, 29, 35, 38) are each formed with double row inner raceway surfaces (4a, 5a, 31a) on its outer circumferential surface arranged opposite to the double row outer raceway surfaces (2a, 2b). Double row ball groups (3) are freely rollably contained between the outer raceway surfaces (2a, 2b) and inner raceway surfaces (4a, 5a, 31a) of the inner members (1, 20, 29, 35, 38) and the outer member (2, 30). A pitch circle diameter (PCDo) of a ball group (3) near a wheel mounting flange (6) is larger than a pitch circle diameter (PCDi) of a ball group (3) away from the wheel mounting flange (6). Each corner of the shoulders of the outer and inner raceway surfaces (2a, 2b, 4a, 5a, 31a) is rounded as a smooth circular arc.

12 Claims, 12 Drawing Sheets

(56) References Cited

U.S. PATENT DOCUMENTS

| | | | |
|---|---|---|---|
| 5,226,738 | A | 7/1993 | Valette et al. |
| 5,501,530 | A | 3/1996 | Nagai et al. |
| 6,368,223 | B1* | 4/2002 | Ouchi et al. .................. 464/145 |
| 6,428,214 | B2* | 8/2002 | Tajima et al. .................. 384/544 |
| 6,993,844 | B2* | 2/2006 | Toda et al. ............... 29/898.062 |
| 7,117,599 | B2* | 10/2006 | Sadanowicz et al. .... 29/894.361 |
| 7,147,381 | B2* | 12/2006 | Ohtsuki ........................ 384/537 |
| 2001/0007600 | A1 | 7/2001 | Tajima et al. |
| 2002/0121020 | A1 | 9/2002 | Obara |
| 2005/0111771 | A1* | 5/2005 | Shevket ........................ 384/544 |
| 2005/0185870 | A1* | 8/2005 | Kobayashi et al. ........... 384/544 |
| 2006/0120650 | A1* | 6/2006 | Niebling et al. .............. 384/544 |

FOREIGN PATENT DOCUMENTS

| | | |
|---|---|---|
| JP | 57-006125 | 1/1982 |
| JP | 63-166601 | 7/1988 |
| JP | 01-190586 | 7/1989 |
| JP | 03-096717 | 4/1991 |
| JP | 08-091187 | 4/1996 |
| JP | 11-062985 | 3/1999 |
| JP | 11-129703 | 5/1999 |
| JP | 11-182537 | 7/1999 |
| JP | 2000-071705 | 3/2000 |
| JP | 2000-110839 | 4/2000 |
| JP | 2000-289403 | 10/2000 |
| JP | 2001-130211 | 5/2001 |
| JP | 2001-138704 | 5/2001 |
| JP | 2001-193745 | 7/2001 |
| JP | 2002-160503 | 6/2002 |
| JP | 2003-074570 | 3/2003 |
| JP | 2003-097577 | 4/2003 |
| JP | 2003-166551 | 6/2003 |
| JP | 2004-052784 | 2/2004 |
| JP | 2004-100754 | 4/2004 |
| JP | 2004-108449 | 4/2004 |
| JP | 2004-345543 | 12/2004 |
| JP | 2005-140181 | 6/2005 |
| JP | 2005-145313 | 6/2005 |
| JP | 2005-147372 | 6/2005 |
| JP | 2005-231535 | 9/2005 |
| JP | 2005-256898 | 9/2005 |
| WO | WO 2004/022992 | 3/2004 |

OTHER PUBLICATIONS

SKF, "SKF Explorer Angular Contact Ball Bearings", 2003, Retrieved from the Internet: URL:http://www.skf.com/files/239445.pdf.

H. Kottritsch: "A new performance class for angular contact ball bearings", SKF Evolution Magazine, May 16, 2002, Retrieved from the Internet: URL:http://evolution.skf.com/zino.aspx?articleID=408.

* cited by examiner (a)   (b)

(a)　　　　　　　　(b)

BEARING APPARATUS FOR A WHEEL OF VEHICLE

CROSS-REFERENCE TO RELATED APPLICATIONS

This application is a continuation of International Application No. PCT/JP2006/319693, filed Oct. 2, 2006, which claims priority to Japanese Application Nos. 2005-287267, filed Sep. 30, 2005; 2005-306888, filed Oct. 21, 2005; 2005-306889, filed Oct. 21, 2005; 2005-313155, filed Oct. 27, 2005; 2005-316053, filed Oct. 31, 2005 and 2006-214124, filed Aug. 7, 2006. The disclosures of the above applications are incorporated herein by reference.

FIELD

The present disclosure relates to a bearing apparatus that freely rotatably supports a vehicle wheel and, more particularly, to a vehicle wheel bearing apparatus that can suppress damage caused on the balls (i.e. ball damage) of the bearing apparatus during its assembly. Thus, this improves noise characteristics of the bearing apparatus and can simultaneously satisfy the high rigidity and light weight characteristics of the bearing apparatus.

BACKGROUND

The vehicle wheel bearing apparatus that freely rotatably supports a wheel hub that mounts a wheel, via a rolling bearing, includes an inner ring rotation type for a driving wheel and both inner ring rotation and outer ring rotation types for a driven wheel. A double row angular ball bearing is widely used in such a bearing apparatus. This is due to the fact that it has a desirable bearing rigidity, high durability against misalignment and small rotation torque that is required for fuel consumption. The double row angular contact ball bearing has a plurality of balls interposed between a stationary ring and a rotational ring. The balls are contacted with the stationary and rotational rings while applied at a predetermined contact angle.

The vehicle wheel bearing apparatus is broadly classified into a first, second, third or fourth generation structure. The first generation includes a wheel bearing with a double row angular contact ball bearing fit between a knuckle, forming part of a suspension, and a wheel hub. The second generation includes a body mounting flange or a wheel mounting flange directly formed on the outer circumferential surface of an outer member. The third generation includes one of the inner raceway surfaces directly formed on the outer circumferential surface of the wheel hub. The fourth generation includes the inner raceway surfaces formed directly on the outer circumferential surfaces of the wheel hub and the constant velocity universal joint.

In prior art wheel bearing apparatus, since both bearing row arrangements in double row bearing are the same, although it has a sufficient rigidity during straight away running, optimum rigidity cannot always be obtained during curved running. That is, the positional relationship between the wheels and the bearing apparatus is usually designed so that the weight of the vehicle acts substantially in the middle between the rows of bearing balls during straight away running. However, a larger radial load and a larger axial load are applied to the axles of the vehicle on the side opposite to the curving direction (e.g., the left hand side of vehicle when right hand curving). Accordingly, it is effective to have a larger rigidity of the bearing row on the outer side than on the inner side of the bearing row in order to improve the durability and strength of the bearing apparatus. Thus, a known vehicle wheel bearing apparatus is shown in FIG. 16 that can have a high rigidity without enlargement of the bearing apparatus.

The vehicle wheel bearing apparatus 50 is formed by a double row angular ball bearing with an outer member 51 integrally formed with a body mounting flange on its outer circumferential surface. The flange is to be mounted on a knuckle (not shown) of a vehicle. The inner circumferential surface of the outer member 51 includes double row outer raceway surfaces 51a, 51b. An inner member 55 includes a wheel hub 52 with an integrally formed wheel mounting flange 53 at one end to mount a wheel (not shown). One inner raceway surface 52a is formed on the inner member outer circumferential surface opposite to one 51a of the double row outer raceway surfaces 51a, 51b. A cylindrical portion 52b axially extends from the inner raceway surface 52a. An inner ring 54 is fit onto the cylindrical portion 52b. The inner ring 54 is formed with the other inner raceway surface 54a on its outer circumferential surface opposite to the other raceway surface 51b of the double row outer raceway surfaces 51a, 51b. Double row ball groups 56, 57 are freely rollably contained between the outer raceway surfaces 51a, 51b and inner raceway surfaces 52a, 54a of the inner member 55. Cages 58, 59 rollably hold the ball groups 56, 57 in place.

The inner ring 54 is axially immovably secured by a caulked portion 52c. The caulked portion 52c is formed by plastically deforming the cylindrical portion 52b of the wheel hub 52 radially outward. Seals 60, 61 are mounted in annular openings formed between the outer member 51 and the inner member 55 to prevent the leakage of grease contained within the bearing apparatus. Also, the seals 60, 61 prevent the entry of rain water or dusts into the bearing apparatus from the outside.

A pitch circle diameter D1 of the outer side ball group 56 is set larger than a pitch circle diameter D2 of the inner side ball group 57. Accordingly, the diameter of the inner raceway surface 52a of the wheel hub 52 is larger than the inner raceway surface 54a of the inner ring 54. Additionally, the outer raceway surface 51a, of the outer side of the outer member 51, is larger than the outer raceway surface 51b of the inner side of the outer member 51. Also, the number of outer side balls 56 is larger than the number of inner side balls 57. By setting the pitch circle diameter D1 of the outer side larger than the pitch circle diameter D2 of the inner side (D1>D2), it is possible to obtain a large rigidity of the bearing apparatus 50 and thus to extend the life of the bearing (see Japanese Laid-open Patent Publication No. 108449/2004).

However, in such a vehicle wheel bearing apparatus 50 of the prior art, since the outer side end portion of the wheel hub 52 is enlarged, the weight of the bearing apparatus is also increased. Accordingly, although the prior art bearing apparatus can increase rigidity, it has an adverse effect of increasing its weight.

Also, in the prior art bearing apparatus 50, a stepped portion 63 is formed on the wheel hub 52 between the inner raceway surface 52a of the outer side and the cylindrical portion 52b, which includes the inner ring 54. The presence of the stepped portion 63 (height of step: (D1−D2)/2) causes a ball problem. The balls 56 of the outer side temporary assembled in the outer raceway surface 51a of the outer member 51 tend to contact the counter portion 62 of the inner raceway surface 52a. Accordingly, the stepped portion 63 of the wheel hub 52 may damage the balls 56 during assembly of the bearing apparatus 50.

In addition, a problem may occur in that micro damages may be caused on the surfaces of the ball groups 56, 57 during temporary assembly of them while they are held by the cages 58, 59 into the double row outer raceway surfaces 51*a*, 51*b* of the outer member 51. That is, micro damage (ball damage) is often caused since the balls 56, 57 are inserted into the inner circumferential surfaces of the counter portions 64, 65 of the outer raceway surfaces 51*a*, 51*b* while being abraded by corners or irregular turned surfaces of the counter portions 64, 65. The damaged surfaces of the balls 56, 57 cause noise to the bearing apparatus and reduce the life of the bearing apparatus. Accordingly, very careful assembling work is required. This reduces assembling efficiency of the bearing apparatus.

SUMMARY

It is, therefore, an object of the present disclosure to provide a vehicle wheel bearing apparatus that can simultaneously solve the antinomic problems of reducing the weight and size of the bearing apparatus while increasing the rigidity of the bearing apparatus.

Another object is to suppress the generation of ball damage during assembly of the bearing apparatus and to extend the life of the bearing apparatus.

To achieve the object, a vehicle wheel bearing apparatus comprises an outer member formed with double row outer raceway surfaces on its inner circumferential surface. Inner members are each formed with double row inner raceway surfaces on their outer circumferential surface arranged opposite to the double row outer raceway surfaces. Double row ball groups are freely rollably contained between the outer raceway surfaces and inner raceway surfaces of the inner members and the outer member. A pitch circle diameter of a ball group near a wheel mounting flange is larger than a pitch circle diameter of a ball group away from the wheel mounting flange. Each corner of the shoulders of the outer and inner raceway surfaces is rounded as a smooth circular arc.

The pitch circle diameter of the ball group near the wheel mounting flange is larger than the pitch circle diameter of the ball group away from the wheel mounting flange. Accordingly, each of the corners of the shoulders of the outer and inner raceway surfaces is rounded as a smooth circular arc. Accordingly, it is possible to suppress the generation of ball damage during assembly of the bearing apparatus and to extend the life of the bearing apparatus.

Also, to achieve the object, a vehicle wheel bearing apparatus comprises an outer member formed with double row outer raceway surfaces on its inner circumferential surface. An inner member includes a wheel hub with an integrally formed wheel mounting flange at one end. One inner raceway surface is formed on the outer circumferential surface of the inner member opposite to one of the double row outer raceway surfaces. A cylindrical portion axially extends from the inner raceway surface. An inner ring is fit onto the cylindrical portion. The inner ring is formed with the other inner raceway surface on its outer circumferential surface opposite to the other raceway surface of the double row outer raceway surfaces. Double row ball groups are freely rollably contained between the outer raceway surfaces and inner raceway surfaces of the inner members and the outer member. A pitch circle diameter of a ball group near the wheel mounting flange is larger than a pitch circle diameter of a ball group away from the wheel mounting flange. A substantially conical recess is formed at an outer side end portion of the wheel hub. The depth of the recess extends to at least near the bottom of the inner raceway surface of the wheel hub so that the outer side end portion of the wheel hub has a substantially constant wall thickness.

The pitch circle diameter of the ball group near the wheel mounting flange is larger than the pitch circle diameter of the ball group away from the wheel mounting flange. A substantially conical recess is formed at an outer side end portion of the wheel hub. The depth of the recess extends to at least near the bottom of the inner raceway surface of the wheel hub so that the outer side end portion of the wheel hub has a substantially constant wall thickness. Accordingly, it is possible to provide a vehicle wheel bearing apparatus that can simultaneously solve the antinomic problems of reducing the weight and size of the bearing apparatus while increasing the rigidity of the bearing apparatus.

A shaft shaped portion is formed to extend from the bottom of the inner raceway surface of the wheel hub toward the cylindrical portion. A tapered stepped portion is formed between the shaft shaped portion and a shoulder, which abuts the inner ring. The depth of the recess extends to near the stepped portion beyond the bottom of the inner raceway surface. This enables a further weight reduction of the bearing apparatus.

A wall thickness of the wheel hub in a direction of the ball contact angle at the inner raceway surface is larger than a wall thickness of the wheel hub at the bottom of the inner raceway surface. This keeps the rigidity of the wheel hub and further reduces the weight of the bearing apparatus.

A predetermined hardened layer is continuously formed by high frequency induction quenching in a region from the base of the wheel mounting flange to the cylindrical portion, including the inner raceway surface of the wheel hub. This improves the strength and durability of the wheel hub.

The thickness of the outer side end of the wheel hub is set more than twice the depth of the hardened layer. This prevents the quenching cracks and improves the strength and rigidity of the wheel hub.

A wall thickness of the wheel hub in a direction of the ball contact angle at the inner raceway surface is set at a range of 0.2~0.3 of the diameter of the ball contact point. This achieves a weight reduction of the bearing apparatus while keeping the strength and rigidity of the wheel hub in accordance with the use conditions.

Each counter portion of the outer raceway surface is rounded as a smooth circular arc. Additionally, the surface roughness of the inner circumferential surface is limited to less than 3.2 Ra. This suppresses the ball contact damage caused during assembly of the bearing apparatus and gouges caused by ball vibration. Thus, this improves the noise characteristics and quality of the bearing apparatus.

The corner portion of the shoulder or the inner circumferential surface of the counter portion of each inner and outer raceway surface is ground simultaneously, by a formed grinding wheel, with the inner and outer raceway surface. This occurs after heat treatment. This enables the transition portion to be smoother.

Chamfered dimensions of the corner portion of the shoulder are set in a range of about 0.15~0.8 mm. The corner radius is set in a range of about 0.15~2.0 mm. The transition portion is smoothly formed. This prevents the balls from being scratched and the oval contact region of each ball from running-over the counter portion and coming-out from the inner raceway surface.

A ratio (d/PCDi) of the outer diameter (d) of each ball to a pitch circle diameter (PCDi) of a ball group away from the wheel mounting flange is set in a range of about $0.14 \leq (d/PCDi) \leq 0.25$. This extends the life of the bearing apparatus while maintaining its high rigidity.

The outer diameter of each ball is the same. The number of balls in the group near the wheel mounting flange is larger than the number of balls in the group away from the wheel mounting flange. This extends the life of the bearing apparatus while maintaining its high rigidity.

A vehicle wheel bearing apparatus comprises an outer member formed with a body mounting flange on its outer circumferential surface. The flange is to be mounted on a knuckle of a vehicle. The outer member is formed with double row outer raceway surfaces on its inner circumferential surface. An inner member includes a wheel hub with an integrally formed wheel mounting flange at one end. One inner raceway surface is formed on the outer circumferential surface opposite to one of the double row outer raceway surfaces. A cylindrical portion axially extends from the inner raceway surface. An inner ring is fit onto the cylindrical portion. The inner ring is formed with the outer inner raceway surface on its outer circumferential surface opposite to the other raceway surface of the double row outer raceway surfaces. Double row ball groups are freely rollably contained between the outer raceway surfaces and inner raceway surfaces of the inner members and the outer member. The outer diameter of each ball is the same. The number of balls in the group near the wheel mounting flange is larger than the number of ball in the group away from the wheel mounting flange. The corner portion of the shoulder or the inner circumferential surface of the counter portion of each inner and outer raceway surface is ground simultaneously, by a formed grinding wheel, with the inner and outer raceway surface, after heat treatment. The corner portion or counter portion are rounded as a smooth circular arc. A substantially conical recess is formed at an outer side end portion of the wheel hub. The depth of the recess extends to at least near the bottom of the inner raceway surface of the wheel hub. Thus, the outer side end portion of the wheel hub has a substantially constant wall thickness Further areas of applicability will become apparent from the description provided herein. It should be understood that the description and specific examples are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

DETAILED DESCRIPTION

Preferable embodiments of the present invention will be hereinafter described with reference to the drawings.

Figure 1:
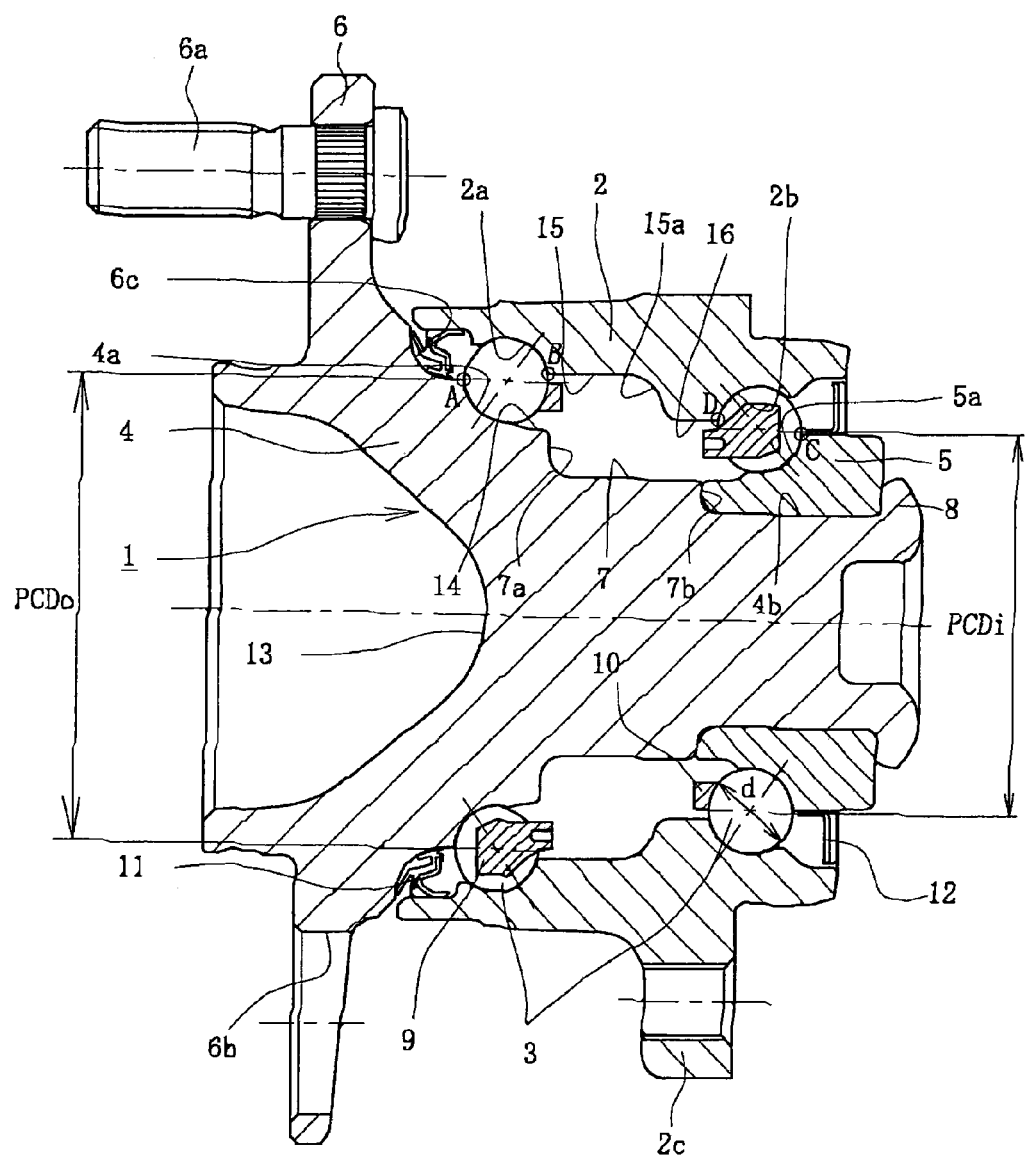
FIG. 1 is a longitudinal section view of a first embodiment of the vehicle wheel bearing apparatus.
Figure 2:
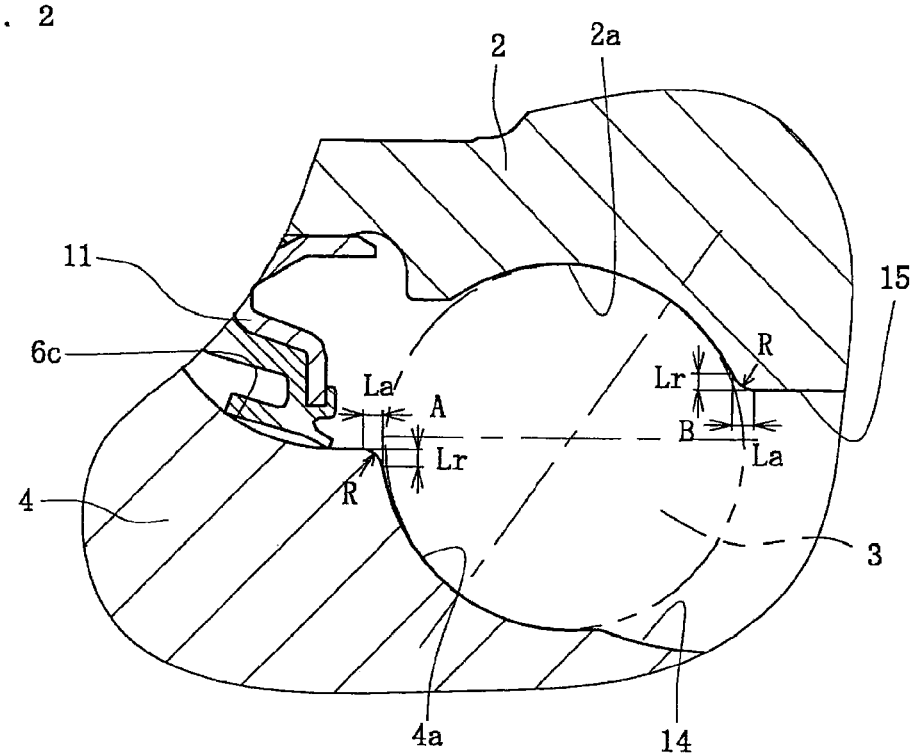
FIG. 2 is an enlarged sectional view of the bearing row of the outer side of FIG. 1.
Figure 3:
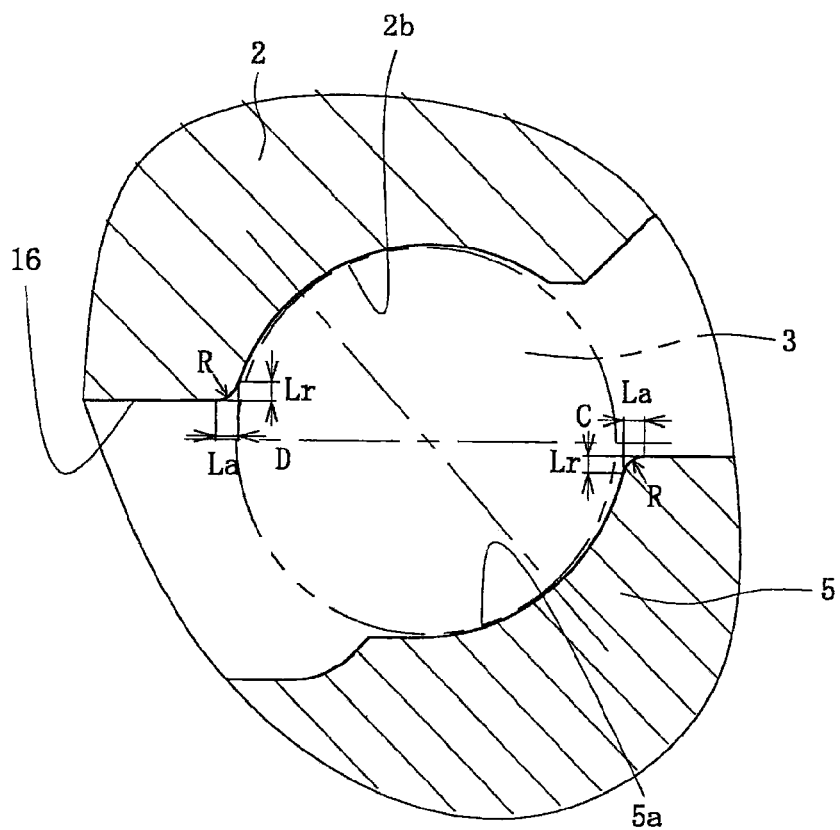
FIG. 3 is an enlarged sectional view of the bearing row of the inner side of FIG. 1.
Figure 4:
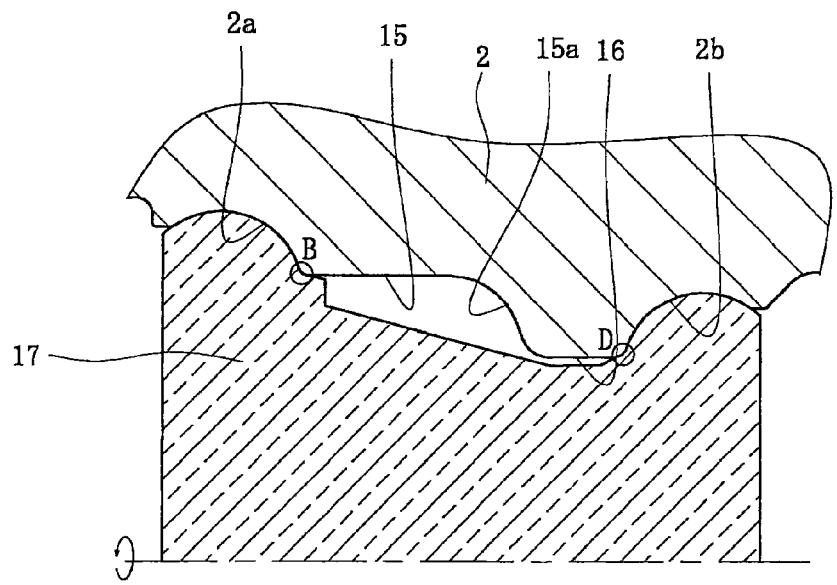
FIG. 4 is a cross-section schematic view showing a grinding wheel applied to the outer member after heat treatment.

FIG. 1 is a longitudinal section view of a first embodiment of the vehicle wheel bearing apparatus. FIG. 2 is an enlarged sectional view of the bearing row of the outer side of FIG. 1. FIG. 3 is an enlarged sectional view of the bearing row of the inner side of FIG. 1. FIG. 4 is a cross-section schematic view showing a grinding wheel applied to the outer member after heat treatment. FIG. 5(a) is a cross-section schematic view showing a grinding wheel applied to the wheel hub after heat treatment. FIG. 5(b) is a cross-section schematic view showing a grinding wheel applied to the inner ring after heat treatment. In the description below, the term "outer side" (left hand side in the drawings) of the apparatus denotes a side that is positioned outside of the vehicle body. The term "inner side" (right hand side in the drawings) of the apparatus denotes a side that is positioned inside of the body when the bearing apparatus is mounted on the vehicle body.

The vehicle wheel bearing apparatus shown in FIG. 1 is a third generation type used for a driven wheel. It comprises an inner member 1, an outer member 2, and double rows of ball groups 3, 3 that are rollably contained between the inner and outer members 1, 2. The inner member comprises a wheel hub 4 and an inner ring 5 press; fit onto the wheel hub with a predetermined interference.

The wheel hub 4 is integrally formed with a wheel mounting flange 6 at one end. One (outer side) inner raceway surface 4a is formed on its outer circumferential surface. A cylindrical portion 4b extends from the inner raceway surface 4a through a shaft shaped portion 7. Hub bolts 6a are arranged on the wheel mounting flange 6 equidistantly along the periphery of the wheel mounting flange 6. Circular apertures 6b are formed between the hub bolts 6a. These circular apertures 6b contribute not only to the weight reduction of the bearing apparatus but to the passage of any fastening tool used to assemble and disassemble of the bearing apparatus.

The inner ring 5 is formed with the outer (inner side) inner raceway surface 5a on its outer circumferential surface. The inner ring 5 is adapted to be press fit onto the cylindrical portion 4b of the wheel hub 4 with a predetermined interference. The inner ring 5 is axially secured by a caulked portion 8 that is formed by plastically deforming the end of the cylindrical portion 4b.

The wheel hub 4 is made of medium carbon steel including carbon of 0.40~0.80% by weight such as S53C. The wheel hub 4 is hardened by high frequency induction quenching. Thus, a region including the inner raceway surface 4a from the inner side base 6c of the wheel mounting flange 6 to the cylindrical portion 4b has a surface hardness of 58~64 HRC. The caulked portion 8 remains as is with its surface hardness after forging. Accordingly, the wheel mounting flange 6 has a sufficient mechanical strength against rotary bending loads applied to it. The anti-fretting strength of the cylindrical portion 4b at a region press fit by the inner ring 5 can be improved and the plastic deforming working of the caulked portion 8 can also be carried out without any micro crack. The inner ring 5 and the balls 3 are made of high carbon chrome bearing steel such as SUJ 2. They are hardened to their core by dip quenching to have a hardness of 58~64 HRC.

The outer member 2 is integrally formed with a body mounting flange 2c on its outer circumferential surface. The body mounting flange 2c mounts on a knuckle (not shown) of a vehicle. The outer member 2 has an outer side outer raceway surface 2a on its inner circumferential surface opposite to the inner raceway surface 4a of the wheel hub 4 and an inner side outer raceway surface 2b opposite to the inner raceway surface 5a of the inner ring 5. Double rows of ball groups 3, 3 are contained between the outer and inner raceway surfaces. Cages 9, 10 rollably hold the balls 3, 3. The outer member 2 is made of medium carbon steel including carbon of 0.40~0.80% by weight such as S53C. The double row raceway surfaces 2a, 2b are hardened by high frequency induction quenching to have a surface hardness of 58~64 HRC.

A seal 11 is mounted on an outer side end portion within an annular space formed between the outer member 2 and the inner member 1. A magnetic encoder 12 is mounted within an inner side end of the annular space to detect the rotational speed of the wheel. The seal 11 and a cap (not shown) covering the opened end of the outer member 2 prevent leakage of grease contained in the bearing. Additionally, the seal 11 prevents the entry of rain water and dust into the bearing from the outside. Although the structure shown here is that of third generation bearing, the bearing apparatus can be applied to the bearings of the first, second and fourth generation structures.

As shown in FIG. 1, a pitch circle diameter PCDo of the outer side ball group 3 is set larger than a pitch circle diameter PCDi of the inner side ball group 3 (PCDo>PCDi). The diameter "d" of each ball 3 is the same in both the outer side and inner side ball groups. Thus, the number of balls 3 in the group in the outer side is larger than the number of balls in the group 3 in the inner side because of the fact PCDo>PCDi.

A substantially conical recess 13 is formed at an outer side end portion of the wheel hub 4. The depth of the recess 13 extends to near the bottom of the inner raceway surface 4a of the wheel hub 4. Thus the outer side end portion of the wheel hub 4 has a substantially constant wall thickness. As clearly shown in FIG. 1, the outline configuration of the wheel hub 4 is gradually reduced from the inner raceway surface 4a to the cylindrical portion 4b via the counter portion 14, a stepped portion 7a, the shaft shaped portion having a smaller diameter, and a shoulder portion 7b, that abuts the inner ring 5. Due to the fact PCDo>PCDi, the diameter of the inner raceway surface 4a of the wheel hub 4 is larger than that of the inner raceway surface 5a of the inner ring 5. The outer diameter of the shaft shaped portion 7 is set so that it has substantially the same diameter as the bottom diameter of the inner raceway surface 5a of the inner ring 5.

On the other hand, in the outer member 2, due to the fact that PCDo>PCDi, the diameter of the outer side outer raceway surface 2a is larger than that of the inner side outer raceway surface 2b. The outer side outer raceway surface 2a continues to the inner side outer raceway surface 2b via a cylindrical shoulder 15, a stepped portion 15a and a shoulder 16 of a smaller diameter. The inner diameter of the bottom of the outer raceway surface 2b is set so that it has substantially same diameter as the inner diameter of the shoulder 15 of a larger diameter.

In the vehicle wheel bearing apparatus having such a structure, since the pitch circle diameter PCDo of the outer side ball group 3 is larger than the pitch circle diameter PCDi of the inner side ball group 3 and the number of balls of the outer side ball group 3 is also larger than the number of balls of the inner side ball group 3, the rigidity of the bearing apparatus at the outer side can be increased. Thus, the life of the bearing apparatus can be extended. In addition, the recess 13 formed at the outer side end portion of the wheel hub 4 provides for the wall thickness of the wheel hub 4 at this outer side end portion to be substantially constant. This solves the antinomic problems of reducing the weight and size of the bearing apparatus and of increasing the rigidity of the bearing apparatus.

In addition to the increase of the bearing rigidity at the outer side, a ratio of the diameter "d" of each ball 3 to the pitch circle diameter PCDi of the inner side ball group 3 (d/PCDi) is set in a predetermined range of about $0.14 \leq (d/PCDi) \leq 0.25$.

In view of the bearing rigidity, a smaller diameter "d" of each ball 3 is preferable since a larger number of balls 3, with a smaller diameter "d", can increase the bearing rigidity in a same pitch circle diameter PCDi. However, in view of the life of the bearing apparatus, a larger diameter "d" of the balls 3 are preferable since the larger diameter "d" of the balls 3 reduces the rolling fatigue strength. As a result of an FEM analysis (analysis using a Finite Element Method), a relationship between the pitch circle diameter PCDi and the diameter "d" of ball 3 has been found and that the bearing rigidity cannot be increased when d/PCDi exceeds 0.25. On the contrary, the rolling fatigue strength is lowered when d/PCDi is less than 0.14. Accordingly, it is possible to satisfy both the increased rigidity and extension of the bearing life by setting the ratio d/PCDi in the range $0.14 \leq (d/PCDi) \leq 0.25$ in addition to setting the pitch circle diameter PCDo of the outer side ball group 3 larger than the pitch circle diameter PCDi of the inner side ball group 3.

Also in this embodiment, each of the corners A~D of the shoulders of the inner and outer raceway surfaces is rounded to have a smooth circular arc as shown in enlarged views of FIGS. 2 and 3. More particularly, each corner is formed so that it has the axial chamfer dimension La of about 0.15~0.8 mm, preferably about 0.15~0.3 mm. The radial chamfer dimension Lr is about 0.15~0.8 mm, preferably about 0.15~0.3 mm. The corner radius R is about 0.15~2.0 mm, preferably about 0.45~0.7 mm in order to have smooth transition portions. When the corner radius R is less than 0.15 mm, the balls 3 tend to be scratched. On the other hand, when the corner radius R exceeds 2.0 mm the oval contact region of the ball 3, the oval region formed by a contact area between the ball 3 and the inner raceway surface 4a, tends to ride over the inner raceway surface 4a and come out from the inner raceway surface 4a.

Figure 5:
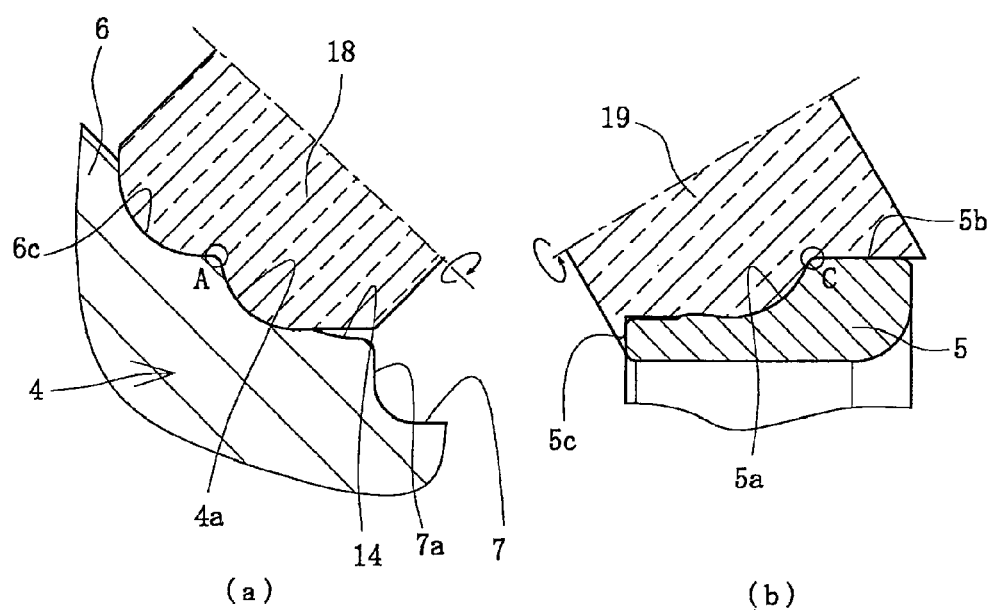
FIG. 5(a) is a cross-section schematic view showing a grinding wheel applied to the wheel hub after heat treatment.
FIG. 5(b) is a cross-section schematic view showing a grinding wheel applied to the inner ring after heat treatment.

As shown in FIGS. 4 and 5, the corner portions A~D of the shoulders of each inner and outer raceway surface are ground simultaneously, by a formed grinding wheel 17, 18, 19, after heat treatment. That is, as shown in FIG. 4, the double row outer raceway surfaces 2a, 2b of the outer member 2 are ground together by the formed grinding wheel 17. The corners B, D of the shoulders are simultaneously ground by the formed grinding wheel 17. As shown in FIG. 5(a), the base 6c, forming the seal land portion of the wheel mounting flange 6 of the wheel hub 4 and the inner raceway surface 4a, are also ground together by the formed grinding wheel 18. The corner A of the shoulder is simultaneously ground by the formed grinding wheel 18. Furthermore, as shown in FIG. 5(b), the inner raceway surface 5a, the outer circumferential surface 5b, on which the magnetic encoder 12 is press fit and the end face 5c of the inner ring 5 are ground together by the formed grinding wheel 19. The corner C of the shoulder is simultaneously ground by the formed grinding wheel 19.

As described above, since the corners A~D are ground simultaneously by the formed grinding wheel 17~19 together with the outer and inner raceway surfaces 2a, 2b, 4a, 5a and each of the corners A~D is rounded as a smooth circular arc, it is possible to suppress the generation of "edge load" even though the oval contacting region rides over each corner A~D when a large bending moment is applied to the wheel bearing apparatus. Accordingly, it is possible to provide a vehicle wheel bearing apparatus that can simultaneously solve the antinomic problems of reducing weight and size of the bearing apparatus and increasing the rigidity of the bearing apparatus. The term "edge load" herein means a large concentrated stress generated in the corners A~D that often causes premature delamination of parts.

Furthermore, since the corners A~D of the shoulders of the outer and inner raceway surfaces are rounded to have a circular arc, the balls 30 are not damaged by the corners A~D during the assembling step. Thus, it is possible to provide a vehicle wheel bearing apparatus that can improve noise characteristics as well as durability.

Figure 6:
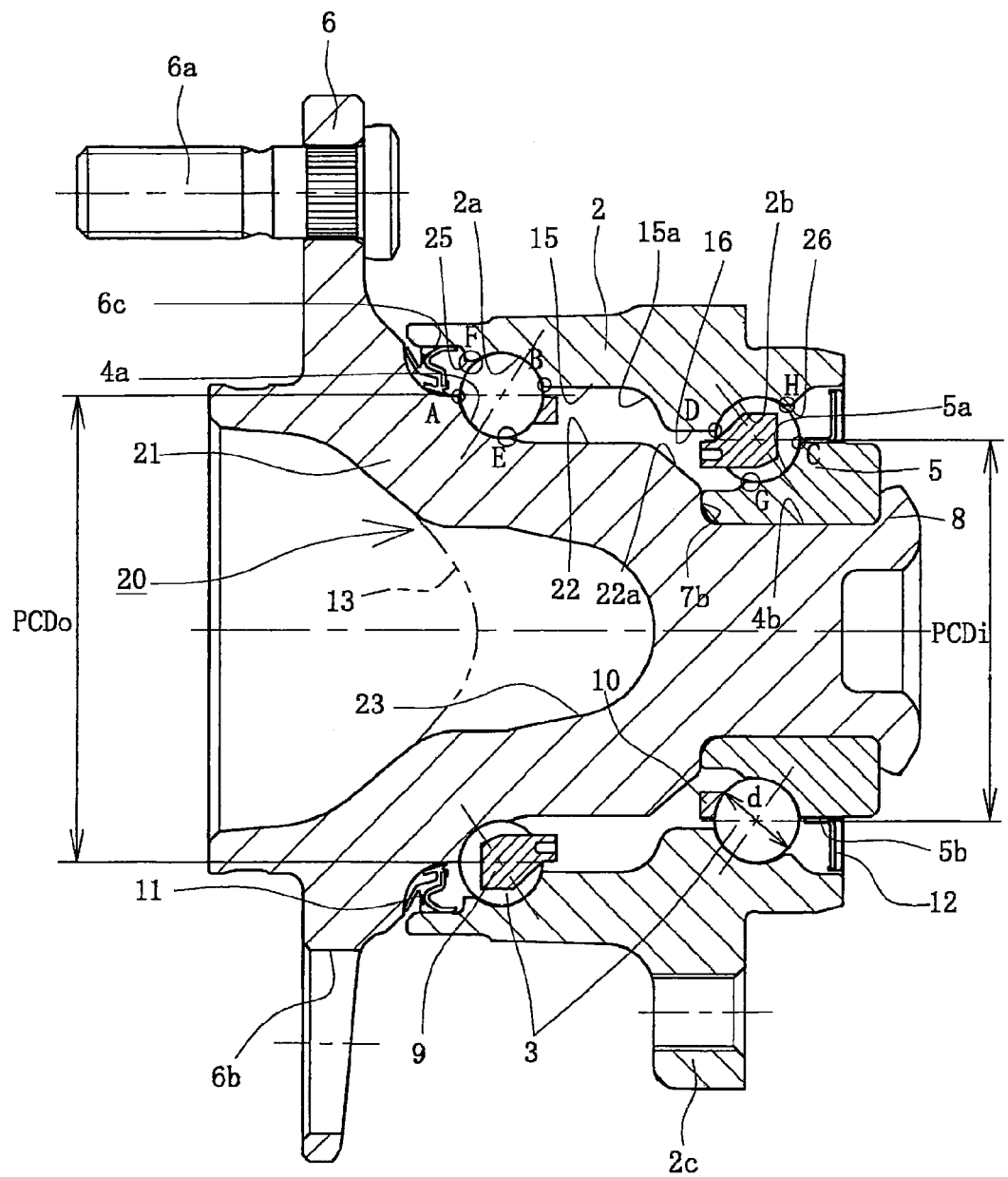
FIG. 6 is a longitudinal section view of a second embodiment of the vehicle wheel bearing apparatus.
Figure 7:
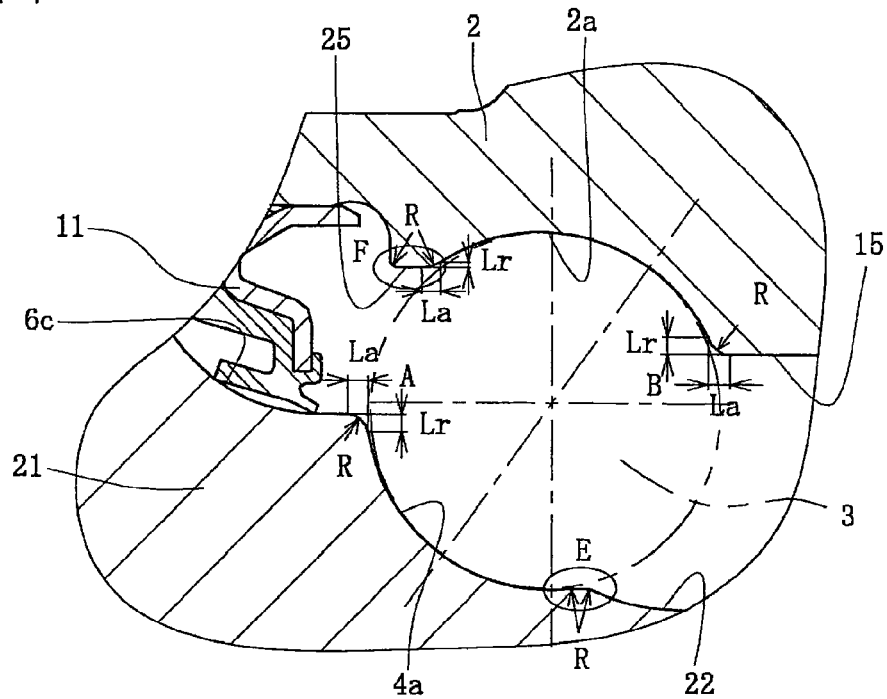
FIG. 7 is an enlarged sectional view of the bearing row of the outer side of FIG. 6.
Figure 8:
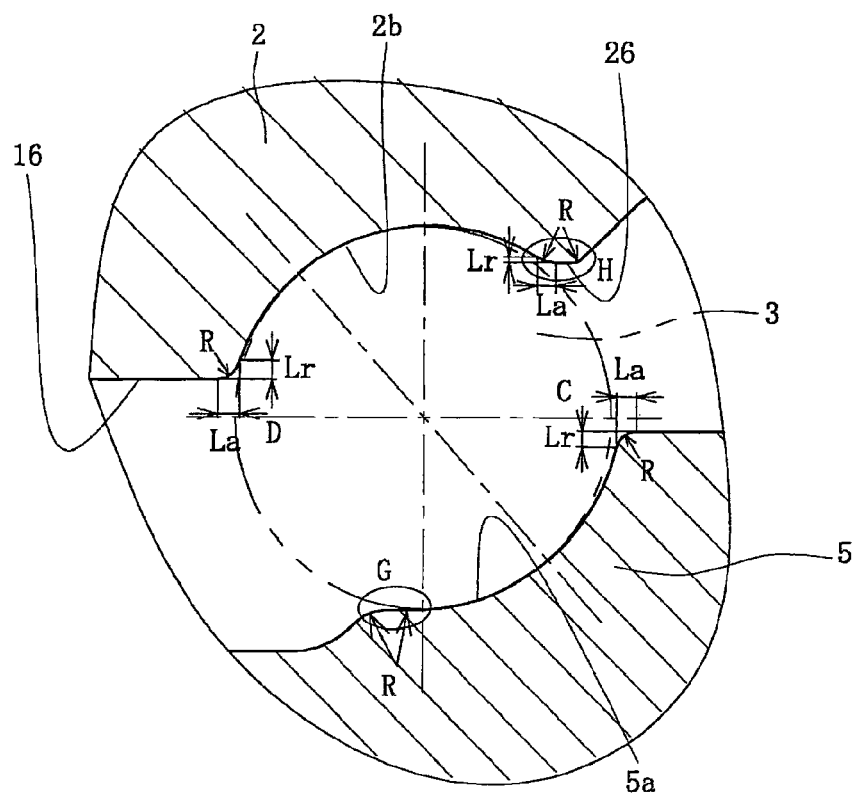
FIG. 8 is an enlarged sectional view of the bearing row of the inner side of FIG. 6.
Figure 9:
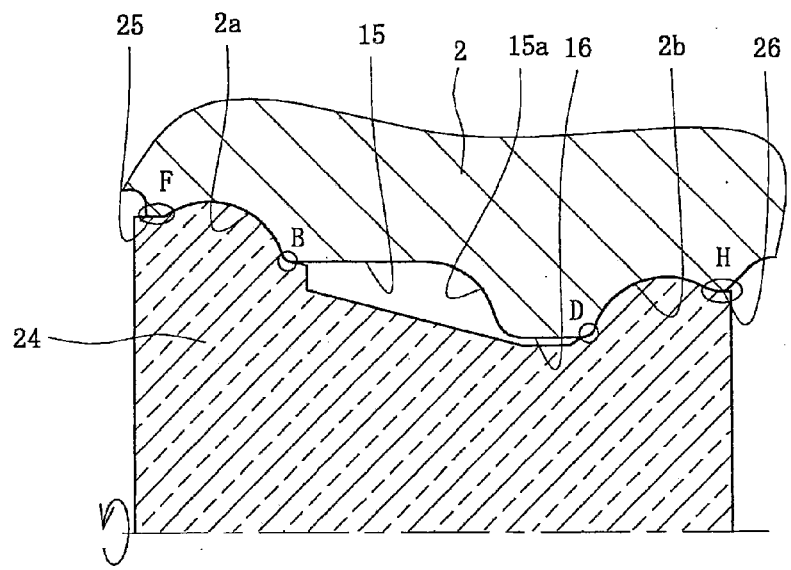
FIG. 9 is cross-section schematic view showing a grinding wheel applied to the outer member after heat treatment.

FIG. 6 is a longitudinal section view of a second embodiment of the vehicle wheel bearing apparatus. FIG. 7 is an enlarged sectional view of the bearing row of the outer side of FIG. 6. FIG. 8 is an enlarged sectional view of the bearing row of the inner side of FIG. 6. FIG. 9 is a cross-section schematic view showing a grinding wheel applied to the outer member after heat treatment. FIG. 10(a) is a cross-section schematic view showing a grinding wheel applied to the wheel hub after heat treatment. FIG. 10(b) is a cross-section schematic view showing a grinding wheel applied to the inner ring after heat treatment. The same reference numerals are used to designate the same parts as those having the same functions used in the first embodiment.

This bearing apparatus is a third generation type used for a driven wheel. It comprises an inner member 20, an outer member 2, and double row ball groups 3, 3 freely rollably contained between the outer and inner members 20, 2. The inner member 20 comprises a wheel hub 21, and the inner ring 5 is press fit onto the wheel hub 21 via a predetermined interference.

The wheel hub 21 is integrally formed with a wheel mounting flange 6 at one end. One (outer side) inner raceway surface 4a is on the outer circumferential surface. A cylindrical portion 4b extends from the inner raceway surface 4a through a shaft shaped portion 22. The wheel hub 21 is made of medium carbon steel including carbon of 0.40~0.80% by weight such as S53C. It is hardened by high frequency induction quenching. Thus, a region including the inner raceway surface 4a from the inner side base 6c of the wheel mounting flange 6 to the cylindrical portion 4b has a surface hardness of 58~64 HRC.

Similar to the first embodiment, a pitch circle diameter PCDo of the outer side ball group 3 is set larger than a pitch circle diameter PCDi of the inner side ball group 3 (PCDo>PCDi). The diameter "d" of each ball 3 is the same in both the outer side and inner side ball groups. Thus, the number of balls in the group 3 in the outer side is larger than the number of balls in the group 3 in the inner side, due to the fact PCDo>PCDi.

In this embodiment, the outer outline configuration of the wheel hub 21 continues from the bottom of the inner raceway surface 4a to the cylindrical portion 4b via the counter portion E, the shaft shaped portion 22 axially extending from the counter portion E, a taper shaped stepped portion 22a, and the shoulder 7b, that abuts the inner ring 5. A recess 23, formed deeper than the recess 13 of the first embodiment (shown by a phantom line), is provided at the outer side end portion of the wheel hub 21. The recess 23 is formed substantially along the outer outline configuration of the wheel hub 21 so that the wall thickness of the outer side end portion of the wheel hub 21 becomes substantially constant. Due to the fact PCDo>PCDi, the diameter of the inner raceway surface 4a of the wheel hub 21 is larger than that of the inner raceway surface 5a of the inner ring 5. Additionally, the outer diameter of the shaft shaped portion 22 is set so that it has a larger diameter than the bottom diameter of the inner raceway surface 5a of the inner ring 5.

In the vehicle wheel bearing apparatus having such a structure, since the pitch circle diameter PCDo of the outer side ball group 3 is larger than the pitch circle diameter PCDi of the inner side ball group 3 and the number of balls of the outer side ball group 3 is also larger than that of the number of balls of the inner side ball group 3, the rigidity of the bearing apparatus at the outer side can be increased. Thus, the life of the bearing apparatus can be extended. In addition a recess 23 is formed at the outer side end portion of the wheel hub 21 so that the wall thickness of the wheel hub 21, at this outer side end portion, is substantially constant. This solves the antinomic problems of reducing the weight and size of the bearing apparatus and increasing the rigidity of the bearing apparatus.

Also in this embodiment, each raceway surface, the shoulder (base portion) 6c, the shoulder 15, the shoulder (outer diameter of the inner ring) 5b, corners of the shoulder 16A, B, C, D are rounded to have a smooth circular arc. The corners of each raceway surface are also rounded to have a smooth circular arc. The counter portions E, F, G, H denote portions axially opposing the shoulders 6c, 15, 5b, 16 of the raceway surfaces, respectively.

As shown in FIGS. 7 and 8, each corner is formed so that it has an axial chamfer dimension La of about 0.15~0.8 mm, preferably 0.15~0.3 mm. The radial chamfer dimension Lr is about 0.15~0.8 mm, preferably 0.15~0.3 mm. The corner radius R is about 0.15~2.0 mm, preferably 0.45~0.7 mm in order to have smooth transition portions.

Figure 10:
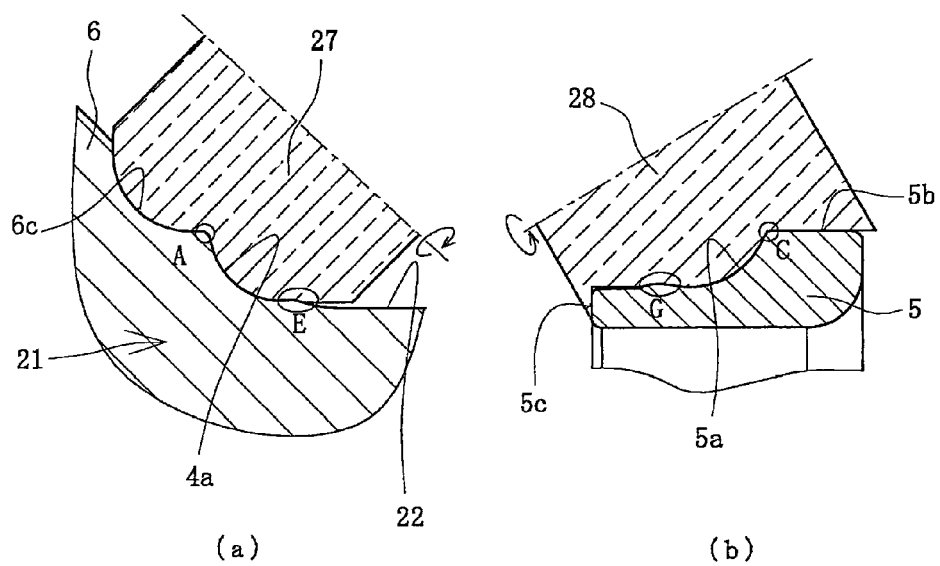
FIG. 10(a) is a cross-section schematic view showing a grinding wheel applied to the wheel hub after heat treatment.
FIG. 10(b) is a cross-section schematic view showing a grinding wheel applied to the inner ring after heat treatment.

As shown in FIGS. 9 and 10, the corner portions A~D of the shoulders of each inner and outer raceway surface are ground simultaneously, by a formed grinding wheel, with the counter portions E~H after heat treatment. That is, as shown in FIG. 9, the double row outer raceway surfaces 2a, 2b of the outer member 2 are ground together, by the formed grinding wheel 24, along with the corners B, D of the shoulders 15, 16 and with the counter portions F, H. The surface roughness of inner circumferential surface 25, 26 of the counter portions F, H is limited to less than 3.2 Ra. The term "Ra" means one of roughness parameters defined in JIS (JIS B0601-1994) and is expressed by an arithmetic mean, a mean of absolute value deviation from an average line. By limiting the surface roughness of the counter portions by less than 3.2 Ra, the balls 30 are not damaged by the counter portions F, H even though the balls 3 are inserted into the inner circumferential surfaces 25, 26 while being abraded by them during assembling steps of the balls 3 into the double row outer raceway surfaces 2a, 2b.

Although it is shown that the inner circumferential surfaces 25, 26 of the counter portions F, H are ground by the formed grinding wheels, simultaneously with the outer raceway surfaces 2a, 2b, the grinding is not limited to such a method. Accordingly, they may be previously formed by turning. In this case, if the turning trace is a lead trace or crossing trace, it would be assumed that the balls 3 would be damaged by the turning cross. Accordingly, it is preferable that the turning is carried out in accordance with the plunge cutting not traverse turning. Also, it is possible to carry out the turning with a slow feeding velocity of bite (less than 0.2 mm/rev). In this case, although the lead trace remains on the turned surface, the height of the cutting trace is reduced and thus the surface roughness is improved. Results of the feeding velocity of bite, the surface roughness of the inner circumferential surfaces 25, 26 of the counter portions F, H, and the depth of scratch formed on the surface of ball during assembly of the bearing apparatus are shown in table 1.

TABLE 1

| Feeding velocity of bite (mm/rev) | Surface roughness of inner circumferential surface of counter portion Ra (μm) | Depth of scratch formed on ball surface (μm) |
|---|---|---|
| 0.3 | 5.8 | 0.6 |
| 0.2 | 3.3 | None |
| 0.1 | 1.6 | None |
| 0.05 | 0.7 | None |

From Table 1 it is clear that the surface roughness of the inner circumferential surfaces 25, 26 of the counter portions F, H becomes less than 3.2 Ra when the feeding velocity of bite is less than 0.2 mm/rev. That is, it will be found that the trace formed by turning is minimized and thus less scratch damage is caused on the ball surface during assembly of the bearing apparatus.

As shown in FIG. 10(a), the base 6c, forming the seal land portion of the wheel mounting flange 6 of the wheel hub 21, and the inner raceway surface 4a are also ground together by the formed grinding wheel 27. The corner A of the shoulder 6c and the counter portion E are simultaneously ground by the formed grinding wheel 18. Furthermore, as shown in FIG. 10(b) the inner raceway surface 5a, the outer circumferential surface 5b, on which the magnetic encoder 12 is press fit, and the end face 5c of the inner ring 5 are ground together by the formed grinding wheel 28. The corner C of the shoulder 5b is simultaneously ground by the formed grinding wheel 28.

The corners A~D and the counter portions E~H are simultaneously ground, by the formed grinding wheel 24, 27, 28, together with the outer and inner raceway surfaces 2a, 2b, 4a, 5a. Each of the corners A~D is rounded to a smooth circular arc. The surface roughness of the inner circumferential surfaces 25, 26 of the counter portions F, H is limited to less than a predetermined value. Accordingly, it is possible to suppress the generation of "edge load" even though the oval contacting region rides over each corner. Accordingly, it is possible to provide a vehicle wheel bearing apparatus that can simultaneously solve the antinomic problems of reducing the weight and size of the bearing apparatus and increasing the rigidity of the bearing apparatus.

Figure 11:
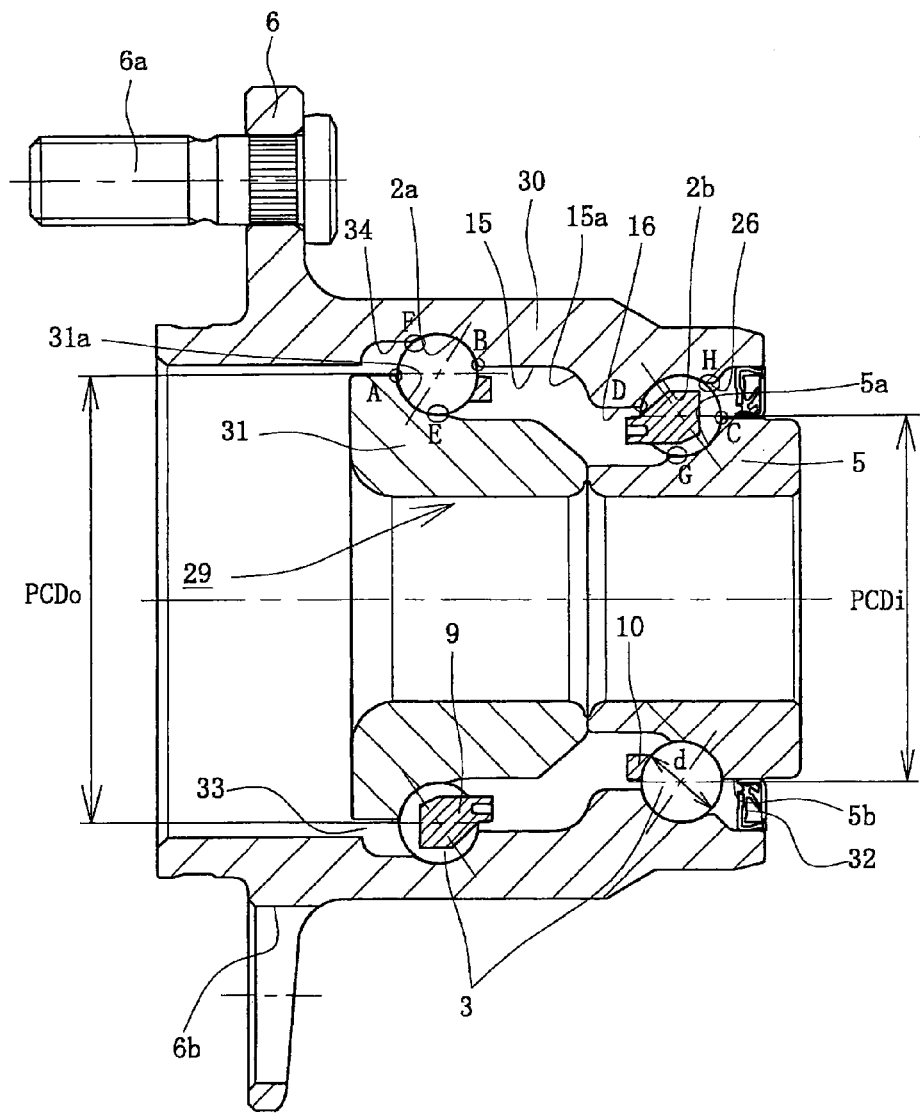
FIG. 11 is a longitudinal section view of a third embodiment of the vehicle wheel bearing apparatus.

FIG. 11 is a longitudinal section view of a third embodiment of the vehicle wheel bearing apparatus. The same reference numerals are used to designate the same parts as those having the same functions used in the previous embodiments.

This bearing apparatus is a second generation type used for a driven wheel. It comprises an inner member 29, an outer member 30, and double row ball groups 3, 3 freely rollably contained between the outer and inner members 29, 30. The inner member 29 comprises a pair of inner rings 31, 5 with inner raceway surfaces 31a, 5a formed on their outer circumferential surfaces.

The outer member 30 is made of medium carbon steel including carbon of 0.40~0.80% by weight such as S53C. The outer member is formed with a wheel mounting flange 6 on its outer circumferential surface. The outer member 30 has double row outer raceway surfaces 2a, 2b on its inner circumferential surface. The double row ball groups 3, 3 are rollably contained between the outer and inner raceway surfaces by cages 9, 10. Thus, it forms a back-to-back double row angular contact ball bearing. A seal 32 is mounted on the inner side end portion of the outer member 30. A labyrinth seal 33 is formed between the outer side end and the inner ring 31. These seals 32, 33 and a cap (not shown), covering the opened end of the outer member 30, prevent leakage of grease contained in the bearing. Additionally, they prevent the entry of rain water and dust into the bearing from the outside.

Similarly to the previous embodiments, a pitch circle diameter PCDo of the outer side ball group 3 is set larger than a pitch circle diameter PCDi of the inner side ball group 3. The diameter "d" of each ball 3 is the same in both the outer side and inner side ball groups. Thus, the number of balls in the ball group 3 in the outer side is larger than the number of balls of the ball group 3 in the inner side, because of the fact PCDo>PCDi. Due to the fact that PCDo>PCDi, the diameter of the outer raceway surface 31a of the outer side inner ring 31 is larger than that of the inner raceway surface 5a of the inner side inner ring 5.

Also similar to the previous embodiment, since the pitch circle diameter of the outer side ball group is set larger than that of the inner side ball group 3, it is possible to extend the life of the bearing. In addition, since the corners A~D of the shoulders and the corners of the counter portions E~H are rounded and formed as smooth circular arcs, as well as the surface roughness of the inner circumferential surfaces 34, 26 of the counter portions F, H of the outer member 30 are limited to less than 3.2 Ra, it is possible to suppress ball damages caused by ball contact or vibration during assembly of the bearing apparatus. Although the inner circumferential surface 26 of the inner side counter portion H of the inner circumferential surfaces 34, 26 of the counter portions F, of the outer member 30 is formed by simultaneous grinding of the outer raceway surface 2b after heat treatment, the inner circumferential surface 34 of the outer side counter portion F may be formed by turning before heat treatment.

Figure 12:
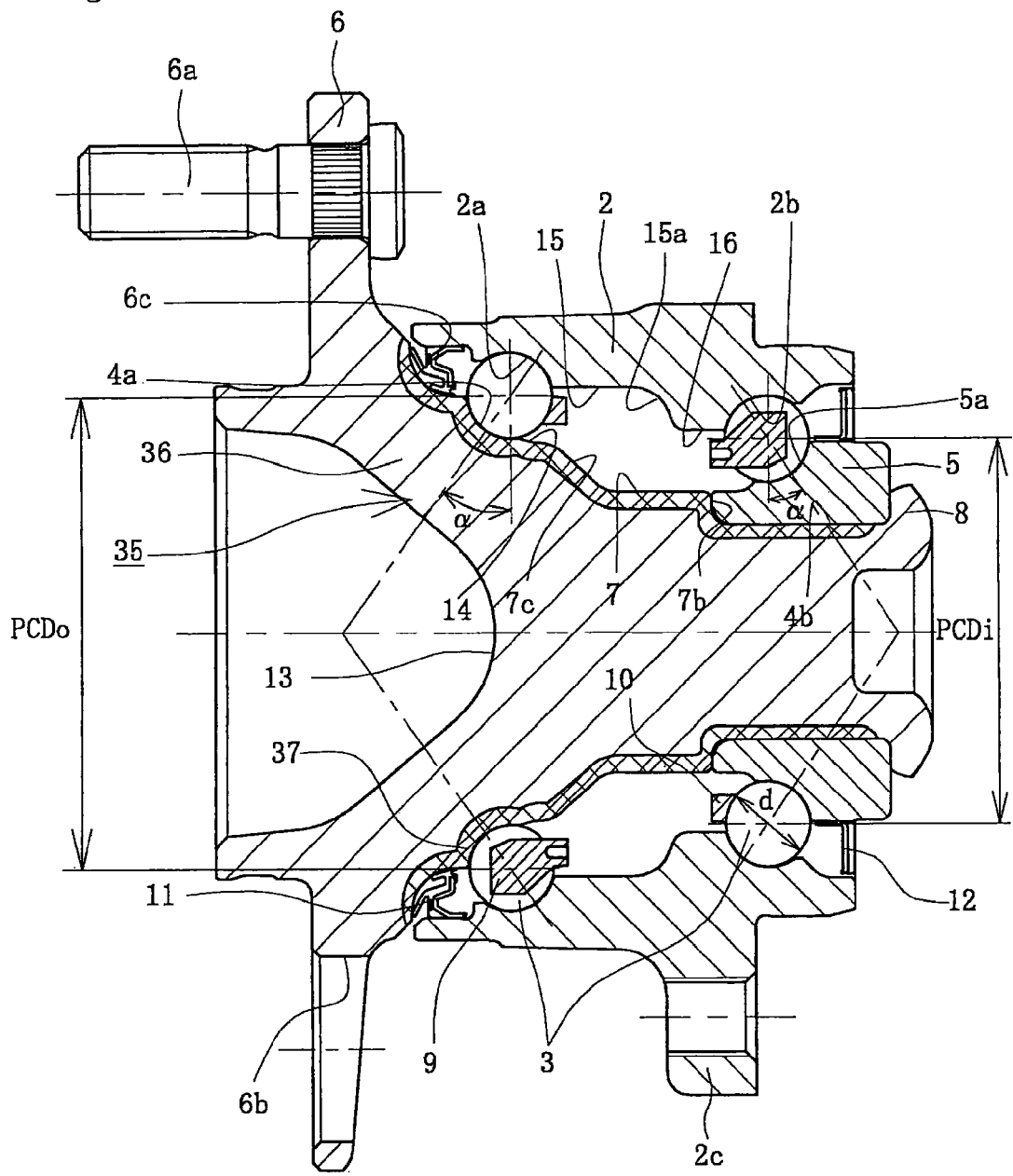
FIG. 12 is a longitudinal section view of a fourth embodiment of the bearing apparatus.
Figure 13:
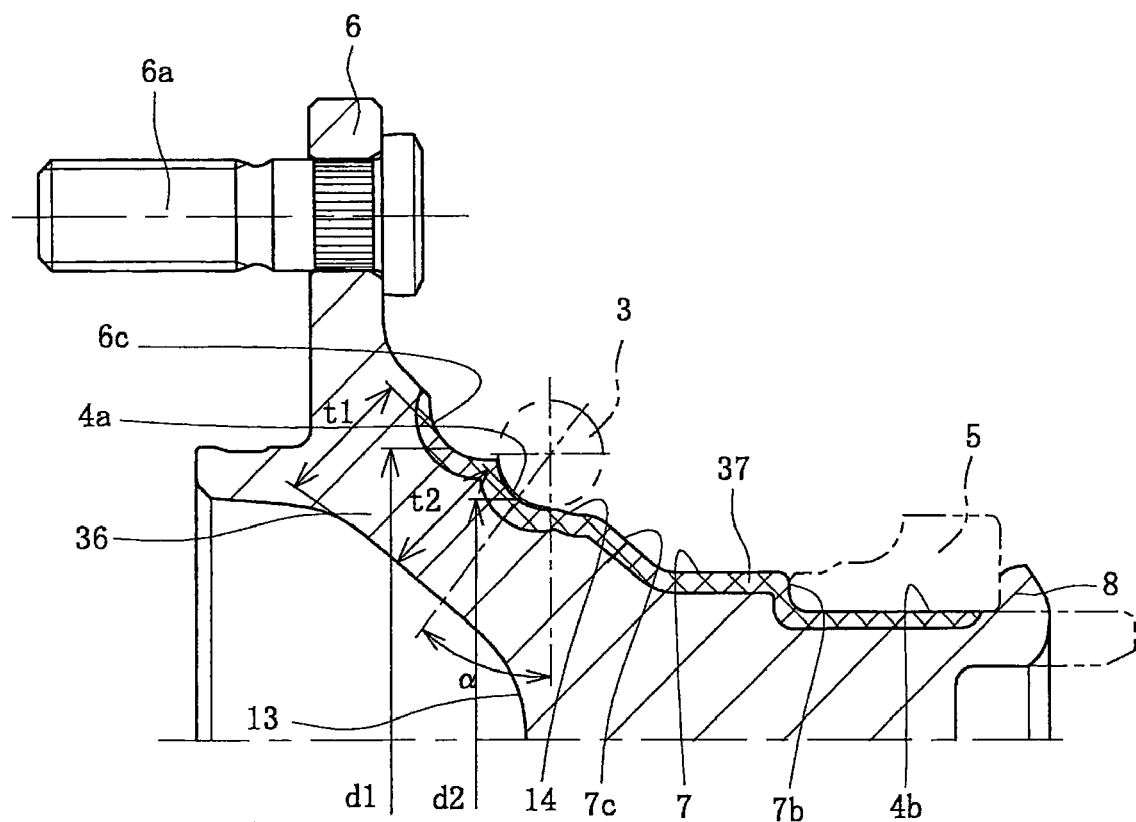
FIG. 13 is an enlarged view of the wheel hub of FIG. 12.

FIG. 12 is a longitudinal section view of a fourth embodiment of the vehicle wheel bearing apparatus. FIG. 13 is an enlarged view of the wheel hub of FIG. 12. This fourth embodiment is a bearing apparatus where the wall thickness of the outer side end portion of the wheel hub of the first embodiment (FIG. 1) is defined. Accordingly, since this embodiment is different from the first embodiment only in the configuration of the wheel hub, the same reference numerals are used to designate the same parts as those having the same functions used in the previous embodiments.

The vehicle wheel bearing apparatus is of a third generation type used for a driven wheel. It comprises an inner member 35, an outer member 2, and double rows of ball groups 3, 3 rollably contained between the inner and outer members 35, 2. The inner member 35 comprises a wheel hub 36 and an inner ring 5 press fit on the wheel hub 36 with a predetermined interference.

The wheel hub 36 is integrally formed with a wheel mounting flange 6 at its one end. One (outer side) inner raceway surface 4a is formed on the outer circumferential surface. A stepped portion 7c extends from the inner raceway surface 4a tapering toward a shaft shaped portion 7 and the cylindrical portion 4b, via a shoulder 7b. The wheel hub 36 is made of medium carbon steel including carbon of 0.40~0.80% by weight such as S53C. It is hardened by high frequency induction quenching. A region including the inner raceway surface 4a from the inner side base 6c of the wheel mounting flange 6 to the cylindrical portion 4b has a hardened layer (shown by cross-hatching) 37 with a surface hardness of 58~64 HRC.

A substantially conical recess 13 is formed at an outer side end portion of the wheel hub 36. The depth of the recess 13 extends to near the bottom of the inner raceway surface 4a of the wheel hub 36. Thus, the outer side end portion of the wheel hub 36 has a substantially constant wall thickness. The applicant has noticed that the wall thickness of the wheel hub 36 at a outer side region from a contacting angle "a" (FIG. 12) is important since it is supposed that the wheel hub 36 would be deformed at the contacting angle "α" (α=30~40°) of the outer side ball 3 when a moment load is applied to the wheel mounting flange 6.

As clearly shown in the enlarged view of FIG. 13, the base 6c of the wheel mounting flange 6 is formed to have a circular arc of a predetermined radius of curvature. As a result of an FEM analysis of a relationship between a minimum wall thickness t1, at the base 6c, and a diameter d1, at the same point in the base 6c, it has found that it is preferable to set the minimum wall thickness t1 so as to satisfy $0.2 \le t1/d1 \le 0.3$. This condition enables reduction of the weight of the wheel hub 36 while keeping the strength and rigidity of the wheel hub 36. That is when the ratio t1/d1 is less than 20% a desirable rigidity cannot be obtained and thus the deformation of the wheel hub 36 becomes too large. On the contrary, when the ratio t1/d1 exceeds 30% the weight of the wheel hub 36 is increased without a large increase of rigidity. In order to prevent quenching cracks, it is preferable to set the minimum wall thickness t1 of the base 6c more than twice the effective depth of the hardened layer 37. The effective depth of the hardened layer 37 is set within a range of about 2~5 mm (usually about 3.5 mm).

Similarly to the relationship at the base 6c of the wheel mounting flange 6, it is preferable to set a relationship between a wall thickness t2 in the direction of contact angle "α" and a diameter (ball contact diameter) d2 at the same point as $0.2 \le t2/d2 \le 0.3$. The minimum wall thickness t2 at that point is set more than twice the effective depth of the hardened layer 37.

According to the bearing apparatus of this embodiment, since the recess 13 is formed at the outer side end portion of the wheel hub 36 along the outline of the outer circumferential surface of the wheel hub 36 as well as each wall thickness t1, t2 set within the predetermined range, it is possible to prevent the generation of quenching cracks and thus to provide a vehicle wheel bearing apparatus that can simultaneously solve the antinomic problems of reducing the weight and size of the bearing apparatus and increasing the rigidity of the bearing apparatus.

Figure 14:
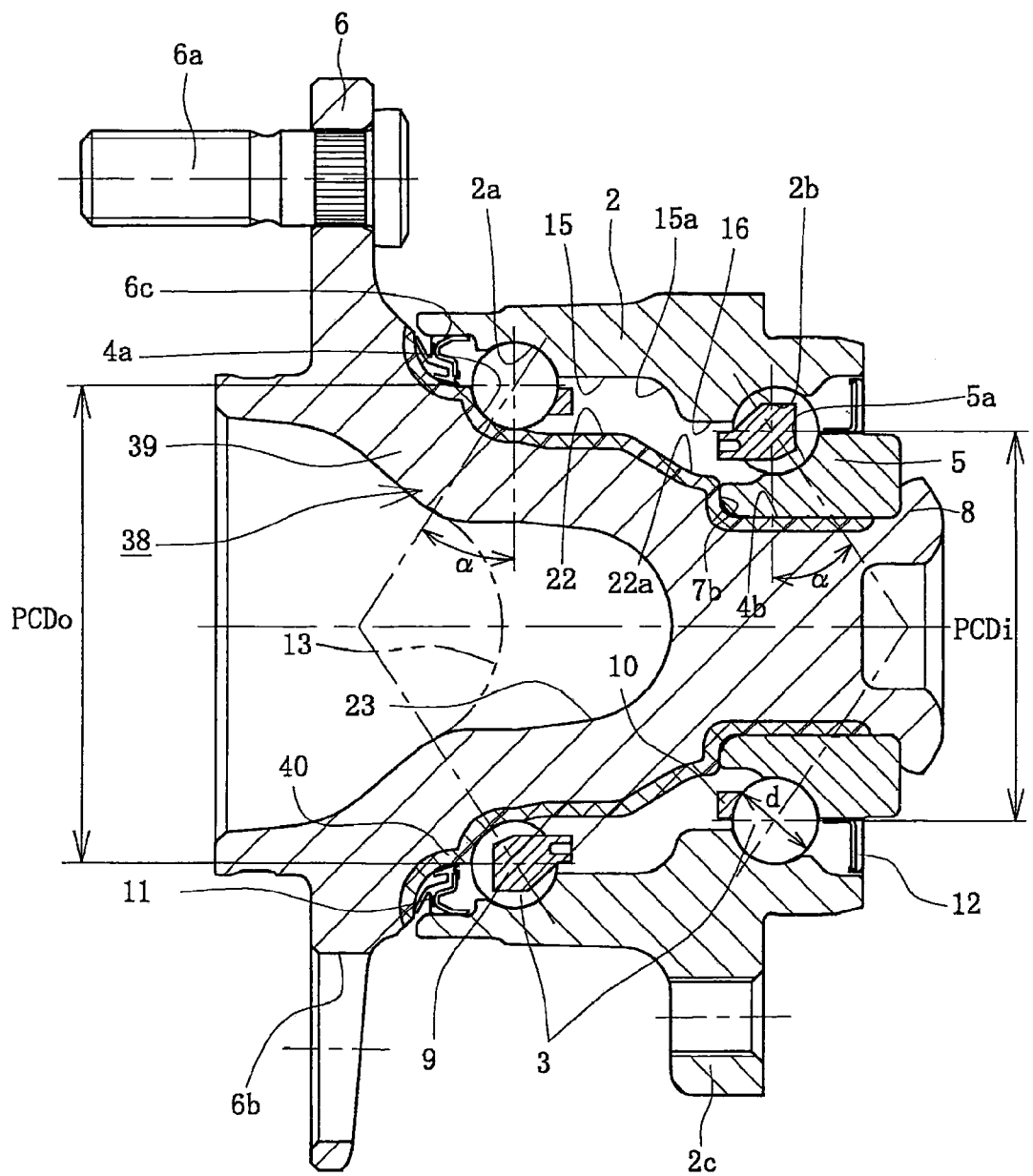
FIG. 14 is a longitudinal section view of a fifth embodiment of the vehicle wheel bearing apparatus.
Figure 15:
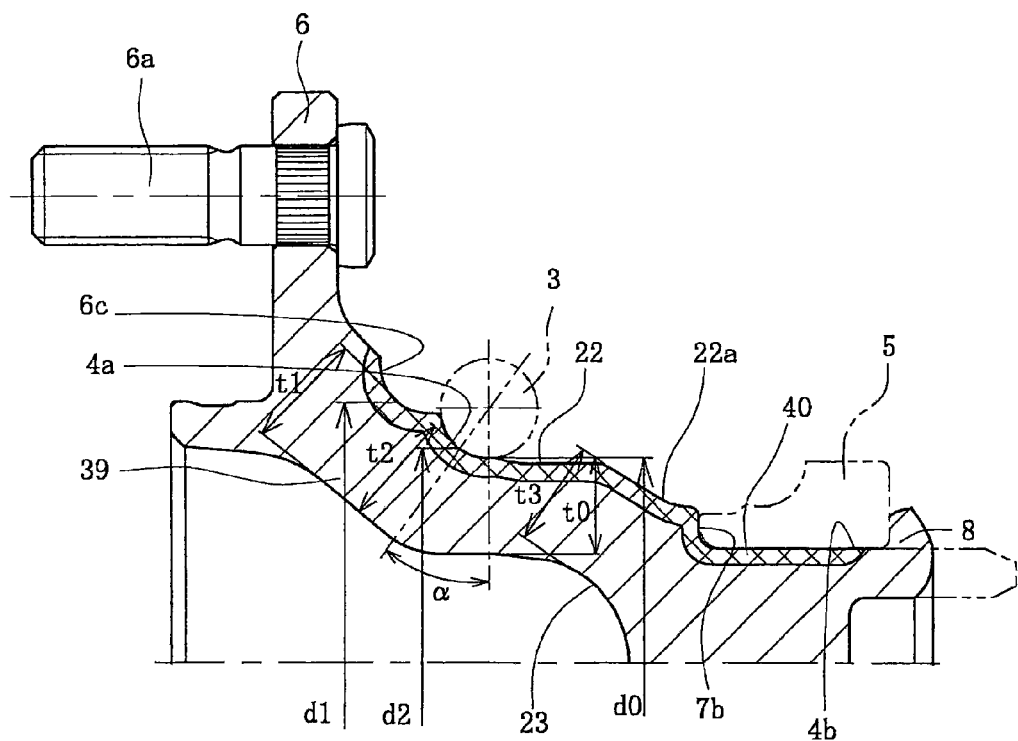
FIG. 15 is an enlarged view of the wheel hub of FIG. 14.
Figure 16:
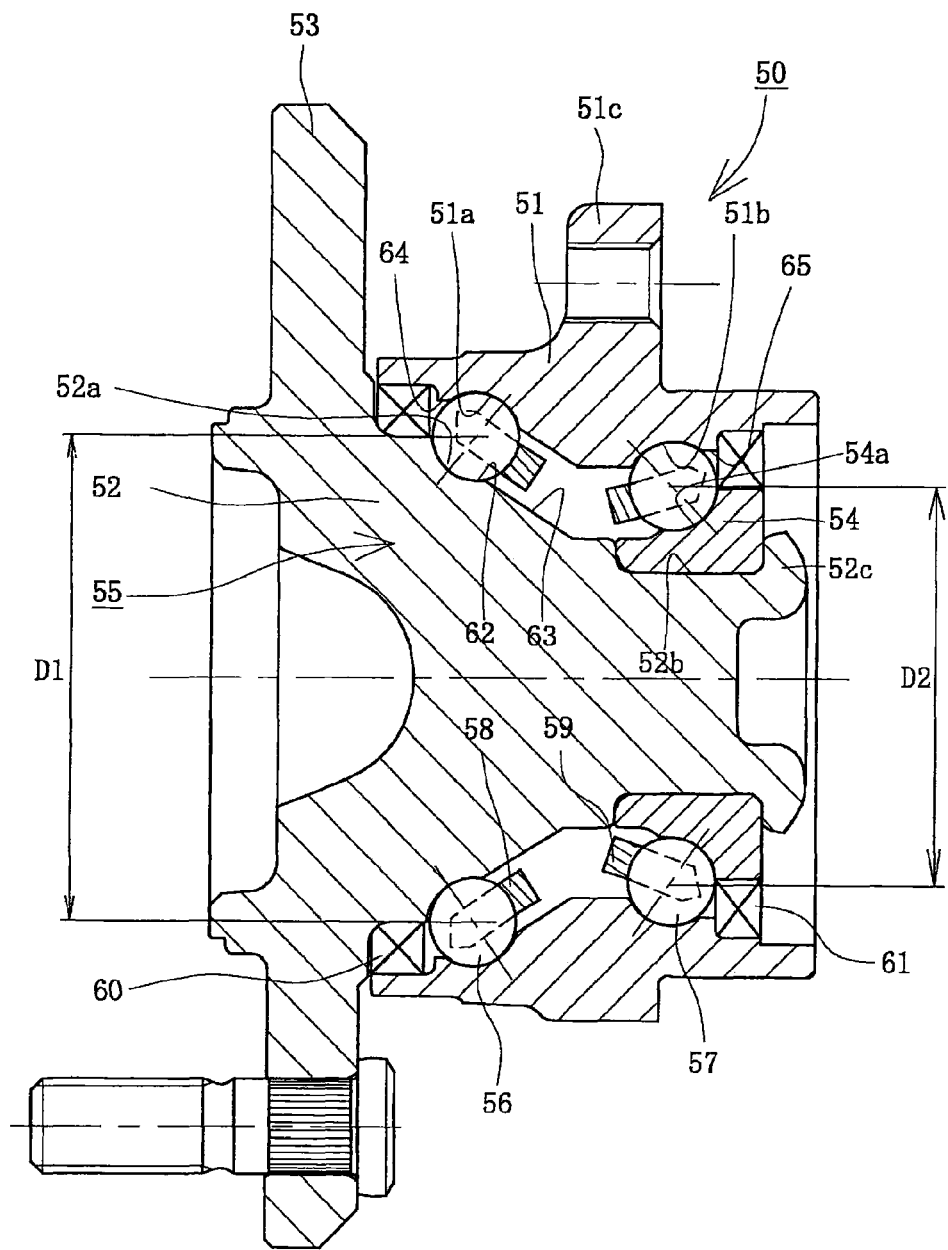
FIG. 16 is a longitudinal section view of a prior art vehicle wheel bearing apparatus.

FIG. 14 is a longitudinal section view showing a fifth embodiment of the vehicle wheel bearing apparatus. FIG. 15 is an enlarged view of the wheel hub of FIG. 14. This fifth embodiment is a bearing apparatus where the wall thickness of the outer side end portion of the wheel hub of the second embodiment (FIG. 4) is defined. Accordingly, since this embodiment is different from the first embodiment only in the configuration of the wheel hub, the same reference numerals are used to designate the same parts as those having the same functions used in the previous embodiments.

The vehicle wheel bearing apparatus is a third generation type used for a driven wheel. It comprises an inner member 38, an outer member 2, and double rows of ball groups 3, 3 rollably contained between the inner and outer members 38, 2. The inner member 38 comprises a wheel hub 39 and an inner ring 5 press fit onto the wheel hub 39 with a predetermined interference.

In this embodiment, the wheel hub 39 is formed with a substantially conical recess 23, deeper than the previous recess 13 (shown by a phantom line) at an outer side end portion of the wheel hub 39. The depth of the recess 23 extends to near the stepped portion 22a beyond the bottom of the inner raceway surface 4a. Thus, the wall thickness of the outer side end portion of the wheel hub 39 becomes substantially constant. That is, as shown in an enlarged view of FIG. 15, a minimum wall thickness t1 of the base 6c of the wheel mounting flange 6 and a wall thickness t2 in the direction of contact angle "a" at the inner raceway surface 4a are set larger than a minimum wall thickness (wall thickness at a position of the bottom diameter d0) t0. The minimum wall thickness t1 of the base 6c and the wall thickness t2 in the direction of contact angle "a" are set within a range 0.2~0.3 of their diameters d1, d2, respectively, and more than twice the effective depth of the hardened layer 40. In addition since a wall thickness t3 at the bottom of the recess 23 is formed substantially the same as the wall thickness t1, t2 at positions other than the contact angle "α", it is possible to keep the rigidity of the wheel hub 39 and to reduce the weight of the wheel hub 39.

In the previous embodiments, although it is described that the outer diameter of each ball 3 is the same, balls having different diameters may be used in each row of balls. For example the diameter of each ball arranged at the outer side may be smaller than that of each ball arranged at the inner side to increase the number of balls in the outer side row.

The vehicle wheel bearing apparatus can be applied to any of the bearing apparatus of the first~fourth generations irrespective of the driving wheel or the driven wheel.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus comprising:
   an outer member formed with double row outer raceway surfaces on an inner circumferential surface of said outer member;
   an inner member formed with double row inner raceway surfaces on an outer circumferential surface of said inner member arranged opposite to the double row outer raceway surfaces;
   a counter portion (E, F, G, H) of each said raceway surface is rounded;
   double row ball groups freely rollably contained between the outer raceway surfaces and inner raceway surfaces of the inner members and the outer member;
   a pitch circle diameter of one of said double row ball groups near a wheel mounting flange is larger than a pitch circle diameter of another one of said double row ball groups away from the wheel mounting flange;
   a corner of each shoulder (A, B, C, D) of the outer and inner raceway surfaces is rounded as a smooth circular arc;
   the respective corner of the shoulder (A, C), raceway surface and counter portion (E, G) of the inner member are ground in place together at the same time and the respective corners of the shoulders (B, D), raceway surfaces and counter portions (F, H) of the outer member are ground in place together at the same time to suppress the generation of edge load when a large bending moment is applied to the wheel bearing apparatus; and wherein an axial chamfer and a radial chamfer dimensions of the corner portion of the shoulder are set in a range 0.15 to 0.8 mm, and the corner radius is set in a range 0.15 to 2.0 mm, and wherein the transition portion is smoothly formed, this prohibits scratching of the balls and an oval contact region of the balls from overriding the inner raceway surface.

2. The vehicle wheel bearing apparatus of claim 1 wherein said counter portion of the outer raceway surface has a smooth circular arc and a surface roughness of inner circumferential surface is limited to less than 3.2 Ra.

3. The vehicle wheel bearing apparatus of claim 1 wherein the corner portions of the shoulders or inner circumferential surface of the counter portion of each inner and outer raceway surface is ground simultaneously by a formed grinding wheel with the inner and outer raceway surface after heat treatment.

4. The vehicle wheel bearing apparatus of claim 1 wherein a ratio of the outer diameter of each ball (d) to a pitch circle diameter (PCDi) of a ball group away from the wheel mounting flange is set in a range $0.14 \leq (d/PCDi) \leq 0.25$.

5. The vehicle wheel bearing apparatus claim 1 wherein the outer diameter of each ball is the same, and a number of balls of the ball group near a wheel mounting flange is larger than a number of balls of the ball group away from the wheel mounting flange.

6. A vehicle wheel bearing apparatus comprising:
an outer member formed with double row outer raceway surfaces on the outer member inner circumferential surface;
an inner member including a wheel hub having an integrally formed wheel mounting at one end, one inner raceway surface formed on the inner member outer circumferential surface opposite to one of the double row outer raceway surfaces, and a cylindrical portion axially extending from the inner raceway surface;
an inner ring fit onto the cylindrical portion and formed with one inner raceway surface on an outer circumferential surface of the inner ring opposite to one raceway surface of the double row outer raceway surfaces;
double row ball groups freely rollably contained between the outer raceway surfaces and inner raceway surfaces of the inner member and the outer member;
a pitch circle diameter of one of the double row ball group near a wheel mounting flange is larger than a pitch circle diameter of another of the double row ball group away from the wheel mounting flange; and
a substantially conical recess is formed at an outer side end portion of the wheel hub, a depth of the recess extends beyond an outer side end of the wheel hub inner raceway surface to at least near the inner raceway surface of the inner ring, a bottom of the recess is formed at an outer side of a shoulder where the outer side of the inner ring abuts the wheel hub forming a step;
the inner member outer circumference defines a contour from a base of the wheel mounting flange to the inner raceway surface and an inner wall contour is defined by the recess from the base of the wheel mounting flange to the bottom of the conical wall recess, a minimum wall thickness t1 at the base of the wheel mounting flange and a wall thickness t2 in a direction of contact angle "α" at the inner raceway surface are set larger than a minimum wall thickness t0, the minimum wall thickness t1 of the base and the wall thickness t2 in the direction of contact angle "α" are set within a range 0.2~0.3 of their diameters d1, d2, respectively, and more than twice an effective depth of the hardened layer, a wall thickness t3 at the bottom of the recess is formed substantially the same as the wall thickness t1, t2 at positions other than the contact angle "α", this increases rigidity of the wheel hub and reduces the weight of the wheel hub, thus the thickness between the outer circumferential contour and the inner wall contour along the contours is substantially constant from the base of the wheel mounting flange to the bottom of the conical recess.

7. The vehicle wheel bearing apparatus of claim 6 wherein a shaft shaped portion is formed to extend from the bottom of the inner raceway surface of the wheel hub toward the cylindrical portion, and a tapered stepped portion is formed between the shaft shaped portion and a shoulder which abuts the inner ring, and the depth of the recess extends to near the stepped portion beyond the bottom of the inner raceway surface of the wheel hub.

8. The vehicle wheel bearing apparatus of claim 7 wherein a wall thickness of the wheel hub in a direction of a ball contact angle at the inner raceway surface is larger than a wall thickness of the wheel hub at the bottom of the inner raceway surface.

9. The vehicle wheel bearing apparatus of claim 6 wherein a predetermined hardened layer is continuously formed by high frequency induction quenching in a region from the base of the wheel mounting flange to the cylindrical portion including the inner raceway surface of the wheel hub.

10. The vehicle wheel bearing apparatus of claim 9 wherein thickness of the outer side end of the wheel hub is set more than twice a depth of the hardened layer.

11. The vehicle wheel bearing apparatus of claim 6 wherein a ratio of the outer diameter (d) of each ball to a pitch circle diameter (PCDi) of the ball group away from the wheel mounting flange is set in a range $0.14 \leq (d/PCDi) \leq 0.25$.

12. The vehicle wheel bearing apparatus claim 6 wherein the outer diameter of each ball is the same, and a number of balls of the ball group near a wheel mounting flange is larger than a number of balls that of the ball group away from the wheel mounting flange.

* * * * *

UNITED STATES PATENT AND TRADEMARK OFFICE
CERTIFICATE OF CORRECTION

PATENT NO.        : 8,840,313 B2
APPLICATION NO.   : 12/057531
DATED             : September 23, 2014
INVENTOR(S)       : Kazuo Komori et al.

It is certified that error appears in the above-identified patent and that said Letters Patent is hereby corrected as shown below:

In the Specification

Column 6
Line 39          "press;" should be --press--

Column 12
Line 36          after "F,", insert --H--

Column 13
Line 24          after "20%", insert --,--
Line 27          after "30%", insert --,--

Signed and Sealed this
Twenty-fourth Day of February, 2015

Michelle K. Lee
*Deputy Director of the United States Patent and Trademark Office*